Jan. 10, 1950
R. D. TRELEASE ET AL
2,494,147
FEEDING DEVICE
Filed May 6, 1944
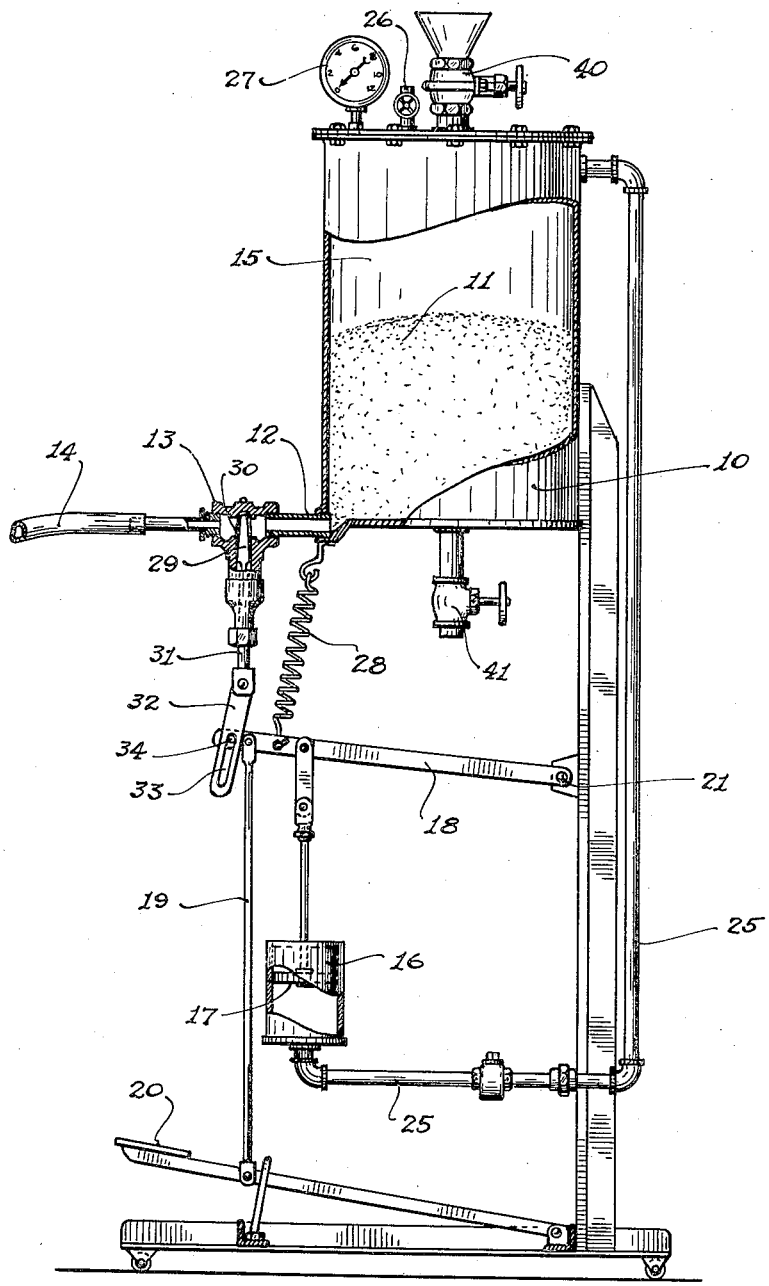
Richard D. Trelease
and Carl H. Koonz
INVENTOR.
ATTEST —
Wm C. Meiser
BY R. G. Story

Patented Jan. 10, 1950

2,494,147

UNITED STATES PATENT OFFICE 2,494,147

FEEDING DEVICE

Richard D. Trelease and Carl H. Koonz, Chicago, Ill., assignors to Swift & Company, Chicago, Ill., a corporation of Illinois Application May 6, 1944, Serial No. 534,496

2 Claims. (Cl. 119—51)

This invention relates to a machine and a method for feeding animals, and more particularly to a machine adapted to the individual feeding of poultry and the like.

It is an object of this invention to provide a machine for gently forcing a relatively fluid feed through a feeding nozzle into the mouth of the bird to be fed.

It is another object of this invention to provide a machine adapted to the individual feeding of poultry which will assure the gentle assurance of feed into the crop of the bird.

It is another object of this invention to provide a compact unitary structure for effecting a delivery of liquid feed.

Other objects of the invention will appear from the description below.

Drawings represent an assembled, partly cutaway side elevation of the preferred embodiment of this invention.

The art of individually feeding poultry is well developed and the merits of this method of feeding poultry to fatten it are well established. Some chickens are quite active and, when they do not eat a full quantity of feed, they remain rather thin. These birds sometimes eat just enough to maintain their body weight, but never reach the fully fattened stage which commands the highest market price. It also happens that when poultry are confronted with new surroundings they may not consume sufficient feed, and again certain classes of poultry such as roasters often are capable of efficiently handling a considerable larger volume of feed than they will normally consume from feed troughs.

In practice, it has been found that, on the average, one hundred spring chickens weighing five pounds per bird must consume about twenty pounds of adequate feed a day in order to about maintain their body weight. Generally feed in addition to this quantity must be taken by the bird to fatten it and when the bird is permitted to feed freely at a trough, not all the birds consume the additional quantity of feed required to fatten them for the market. If thirty pounds of feed per one hundred birds is consumed daily, a most efficient utilization of feed is accomplished to produce the desired increase in weight. When individual feeding is practiced for a period of one to several weeks with just the proper quantity of feed for each bird, very favorable increases in yields are realized.

Thus, to overcome the habits of the birds which do not eat enough, and to get the maximum benefit from the feed, quite generally use has been made of means to mechanically feed poultry. This procedure involves inserting a tube into the mouth of the bird and then effecting a delivery of feed through the tube into the throat of the bird from where it flows downwardly until it lodges in the bird's crop. By individually feeding birds for fattening them, the proper quantity of feed can be supplied to their crops so that they will be fattened in as short a time as possible with no undue waste.

Machines have been available in the past to perform this poultry feeding process but with all known types considerable skill is required on the part of the operator in order to cause the feed to flow gently into the relatively delicate throat of the bird. The prior art machines usually provide a treadle drive for a positive pumping means associated with a feed reservoir, and the manner in which the feed leaves the known types of machines is dependent upon the manner in which the operator handles the treadle. To properly deliver the feed to the poultry, it must be made to flow from the machine in a uniform and gentle manner so that each bird's crop becomes comfortably and uniformly filled. Vast experience and great patience is required to operate the known types of units and the successful use of the method is at present limited because sufficient numbers of qualified operators cannot be found.

The present invention thus provides a machine and method designed for individual feeding of poultry in a manner to avoid the deficiencies of the prior art machines and methods of feeding. The machine is so designed that even an inexperienced operator can use it most successfully. The herein disclosed machine is operative to effect delivery of a liquid or fluid type of feed material into a bird's throat by causing the feed to issue smoothly and gently from a tube or nozzle inserted in the throat. The driving pressure produced behind the fluid for moving it is so controlled that the feed can never be issued through the delivery nozzle with so great a force as to cause discomfort to the bird, yet it is always delivered with sufficient force to cause the proper filling of the crop.

Referring more particularly to the drawings, one form of a machine adapted to perform this invention is shown. The machine includes a feed reservoir 10 to receive a supply of relatively liquid or "pour" feed material 11 which may be issued through an outlet 12, valve 13, into a nozzle or rubber tubing 14 for delivery into the mouth of the bird to be fed. The liquid feed material is maintained in the reservoir under pressure by means of a body of a compressible gas disposed in the unfilled space 15 at the upper part of the reservoir and when the valve 13 is opened, the pressure of the gas in the space 15 forces a portion of the feeding material out through the nozzle.

In order to maintain a supply of compressed gas in space 15 a gas pump 16 is provided and the piston 17 of this pump is operated from lever 18 which in turn is driven through link 19 from treadle 20. As lever 18 oscillates about its pivot 21 the piston 17 is reciprocated to deliver air under pressure into conduit 25 which conveys the compressed gas into the upper part of the reservoir 10 and into the space 15. A suitable bleed valve 26 and pressure gauge 27 are provided so that the proper pressure may be maintained in space 15. For delivery of a substantially fluid feed mixture into the throat and crop of the poultry, a pressure of approximately two pounds per square inch above atmospheric has been found most suitable.

After being driven downwardly to compress a charge of gas in pump 16, the lever 18 is returned to its upper limit by a spring 28, and by operating treadle 20 up and down a plurality of times, any desired pressure can be produced in the chamber 15. Positive control of the pressure can be maintained by manipulation of the bleed valve 26 which may be manually controlled or an automatic device, and a pressure indicator 27 is provided to check the pressure of the gas in space 15. The lever 18 may be adjustably mounted with respect to the pump in any well known manner so that the length of the stroke of piston 17 may be controlled to vary the quantity of air or gas pumped as desired.

It has been stated above that flow of the feeding material from the reservoir is controlled by valve 13 disposed in outlet 12. Valve 13 may conveniently take the form of a freely movable or unbiased quick acting gate valve and the gate is preferably designed to be quickly withdrawn from its seat to establish flow of feed in outlet 12 and to be quickly driven back into its seat to stop the flow, as desired. The gate 29 cooperates with a seat 30 in the valve 13 and the gate has a stem 31 fixed thereto which extends out through the bonnet of the valve so that the gate may be operated by pushing or pulling the stem. The stem 31 is connected to the free end of lever 18 through a link 32 and a lost motion connection which includes slot 33, and pin 34. The valve is opened when lever 18 is driven downwardly so that the pin 34 moves through slot 33 and engages against the lower end of the slot, thus, upon continued movement of lever 18, the stem 31 is pulled downwardly through link 32 to draw gate 29 away from seat 30. Upon releasing the treadle, the spring 28 will lift lever 18 to first drive pin 34 upwardly through slot 33 and then when pin 34 is driven against the upper end of slot 33, the link 32 is lifted to drive the gate valve against its seat.

It is to be noted that the valve 13 and pump 16 are both operated from the single treadle drive 20 and as will appear more fully below, they are operated in timed relation to provide a gas compressing, pumping and feeding cycle. Furthermore, in feeding the animals, both hands of the operator are occupied with the holding of a chicken, for example, while inserting the nozzle 14 in its throat and feeding the bird. The structure making use of the foot treadle to supply energy to the pump to effect a flow of feed and to also operate the valve in the feed line, therefore, serves a dual purpose.

In the operation of this machine, after the relatively fluid feeding material has been placed in the reservoir, all of the outlets from the reservoir are closed and the treadle 20 is operated to drive lever 18 whereby the piston 17 is driven to compress the air in cylinder 16 and deliver it into space 15. During the initial pumping operation, or whenever an insufficient pressure exists in the space 15, the treadle may be reciprocated to oscillate lever 18 throughout only a portion of the arc through which it is movable so that the pin 34 reciprocates through the length only of slot 33 of the lost motion connection. When lever 18 is driven in this manner, the pump may be operated to compress a gas and deliver it into space 15, without the gate valve being opened. This construction enables the operator to produce a working pressure in space 15 without permitting the escape of any feed from the reservoir.

When the desired pressure has been established in the compressed gas zone 15 over the feed maintained in the reservoir, the treadle may then be driven through a full stroke to first pump a quantity of compressed gas into the chamber 15 and then open the gate valve 29 as the pin 34 reaches the lower end of slot 33 and carries link 32 with it. The pressure maintained in the space 15, when feeding poultry, of approximately two pounds per square inch above atmospheric, is just sufficient to force a fluid poultry feed into the throat and crop of the bird in an effective manner. A portion of the pressure will, of course, be diminished by the friction in the feed material delivery duct 12, valve 13, nozzle 14, etc. and thus the feed issues into the bird's throat at less than two pounds of pressure. When the crop and throat become filled the back pressure exerted against the material flowing to the nozzle is sufficient to prevent further flow of feed therethrough and flow of feeding material is automatically discontinued as soon as the proper filling of the poultry has been accomplished.

During the normal operation of this machine the volume of the compressed gas pumped from pump 16 into space 15 is about equal to or slightly larger than the volume of feed issued through nozzle 14 in feeding the particular animal being treated. Thus, if in feeding a particular type of animal, say twelve cubic inches of feed is delivered into the animal's throat and crop, twelve cubic inches or slightly more of air at the working pressure is forced into chamber 15. When gas is added to the chamber 15 in quantities about equal to the amount of feed delivered out through the nozzle 14, the pressure in the reservoir will be maintained in a substantially constantly balanced condition. Also, when the quantity of air is thus controlled, a minimum quantity of work need be done for no waste work is performed in needlessly compressing an undue volume of air, the largest portion of which would then have to be exhausted through an automatic bleed valve to maintain the desired constant working pressure.

The use of a compressed gas in the reservoir to drive the fluid feed out of the nozzle 14 causes the feed to gently issue from the nozzle and in using a compressible gas maintained at a uniform pressure, the flow is always quite even. The compressible gas of course absorbs any quickly applied force without transmitting such force directly to the animal's throat and no matter how rapidly an operator may drive the treadle, the same uniform issuance of feed results whenever the valve in the feed delivery line is opened.

The construction provides a simple individual feeding device including a compressor and valve means both operated from a single treadle so that the hands of the operator are left free for holding the animal. The pressure maintained in the gas chamber 15 is controlled so that when the bird's crop and throat is filled, the back pressure is just sufficient to stop further flow of food through the nozzle and both the overfeeding of and discomfort to the animal are precluded. The treadle drive for the pumping means and the lost motion connection between the lever 18 and link 32 makes it possible to operate the pump without operating the valve, and yet by driving the treadle down to its lowermost limit, the feed valve can be opened as the pump is being simultaneously operated to deliver compressed air into the chamber.

The reservoir 10 may be provided with suitable funnel, inlet valve means 40, and auxiliary valve outlet 41 to facilitate filling and cleaning. The device may be made portable for use on a farm or may be adapted to larger scale commercial use.

The above embodiment sets forth the preferred form of this invention and it is obvious that many modifications will occur to those skilled in the art. All such modifications are contemplated to be within the scope of the following claims.

We claim:

1. A device for feeding fowl and the like including a closed feed supply reservoir with means through which a substantially liquid feed may be inserted therein, an outlet line leading from the reservoir, an unbiased valve in said line with a valve stem and closure by which the flow of feed through said line may be controlled, said stem being longitudinally movable to control the position of the closure, a foot treadle, resilient means to normally hold the treadle in an upward position, means including a reciprocating air pump operatively connected to the treadle to pump air to the upper portion of the reservoir to force the feed therefrom, and a lost-motion connecting link operatively connected between the valve stem and the treadle whereby with any setting of the valve, the treadle may be worked within a restricted range of movement to reciprocate the pump without disturbing the setting of the valve, while a full movement of the treadle may be used to open or close the valve.

2. A device for feeding fowl and the like including a frame adapted to rest on and be moved about the floor, a closed feed supply reservoir supported on the upper portion of the frame, means forming a part of the reservoir by which the reservoir may be partially filled with a substantially liquid feed, a foot lever operatively connected at one end thereof to the frame, a secondary control lever between the foot lever and the reservoir, said control lever being pivotally connected at one end thereof to the frame, a tension rod between said two levers and operatively connected thereto, said pivotal connections being so positioned that the two levers maintain a substantially parallel position, means to limit the upward and downward pivotal movement of the levers, a piston type air pump, an air passage with a check valve interconnecting the pump chamber and the upper portion of the reservoir, a connecting rod depending from said control lever and operatively interconnecting the piston of said pump and said control lever whereby as said levers are depressed from the upper to the lower limit said piston will be advanced in said chamber to pump a predetermined volume of air into said reservoir, said volume being substantially equivalent to the volume of liquid feed to be given to the fowl, a spring to return said levers to the upper limit, outlet means for removing the liquid feed from the bottom of said reservoir, an unbiased valve in said outlet means, said valve having a vertically moving valve stem and closure member, said valve being so positioned that the stem is moved downwardly to open the valve and upwardly to close the valve, and a connecting link between said stem and said control lever, said link having a lost-motion connection incorporated therein whereby as said levers are initially depressed from the upper limit, the valve stem will not be moved while as the levers approach the lower limit the stem will be moved downwardly to open the valve.

RICHARD D. TRELEASE.
CARL H. KOONZ.

REFERENCES CITED

The following references are of record in the file of this patent:

UNITED STATES PATENTS

| Number | Name | Date |
|---|---|---|
| 311,225 | Born | Jan. 27, 1885 |
| 861,005 | Wentzien | July 23, 1907 |
| 876,458 | Hollowell | Jan. 14, 1908 |
| 1,759,727 | Baccich et al. | May 20, 1930 |
| 2,103,687 | McKenney | Dec. 28, 1937 |
| 2,362,215 | Morreale | Nov. 7, 1944 |

FOREIGN PATENTS

| Number | Country | Date |
|---|---|---|
| 41,844 | Austria | Apr. 25, 1910 |